(12) United States Patent
Brady et al.

(10) Patent No.: US 8,246,313 B2
(45) Date of Patent: Aug. 21, 2012

(54) DYNAMIC PORT FOR MEASURING REACTOR COOLANT PUMP BEARING OIL LEVEL

(75) Inventors: David R. Brady, Export, PA (US); Christopher Snodgrass, Pittsburgh, PA (US); Thomas G. Loebig, Pittsburgh, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 792 days.

(21) Appl. No.: 12/493,261

(22) Filed: Jun. 29, 2009

(65) Prior Publication Data

US 2010/0329411 A1     Dec. 30, 2010

(51) Int. Cl.
*F04B 49/00*     (2006.01)

(52) U.S. Cl. ............ 417/36; 417/1; 376/347; 376/361

(58) Field of Classification Search .............. 376/347, 376/361; 417/36, 37
See application file for complete search history.

(56) References Cited

U.S. PATENT DOCUMENTS

| 4,269,566 A | * | 5/1981 | Spruiell .................... 415/112 |
| 4,564,500 A | * | 1/1986 | Keady ........................ 376/463 |
| 5,604,777 A | | 2/1997 | Raymond et al. |

* cited by examiner

*Primary Examiner* — Ricardo Palabrica
*Assistant Examiner* — Marshall O'Connor

(57) ABSTRACT

A dynamic port that extends from the bottom wall of an oil reservoir that surrounds the lower guide bearing of a reactor coolant pump and is in fluid communication within an oil level gauge. The dynamic port is rotatable into and out of the oil flow path to adjust the dynamic oil level shown by the oil level gauge when the pump is at operating speed to be substantially equal to the static oil level when the motor is at rest.

6 Claims, 4 Drawing Sheets

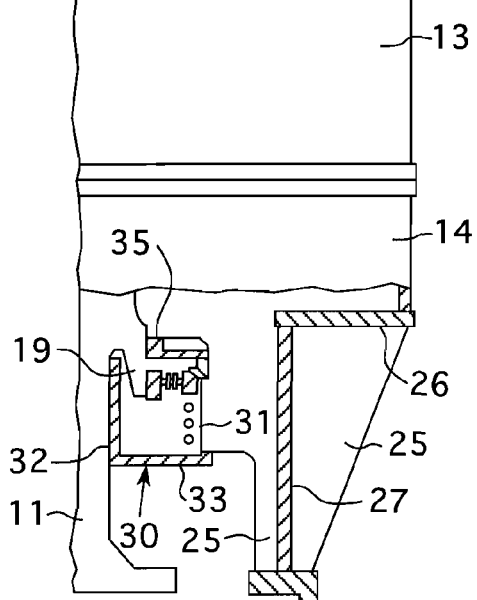
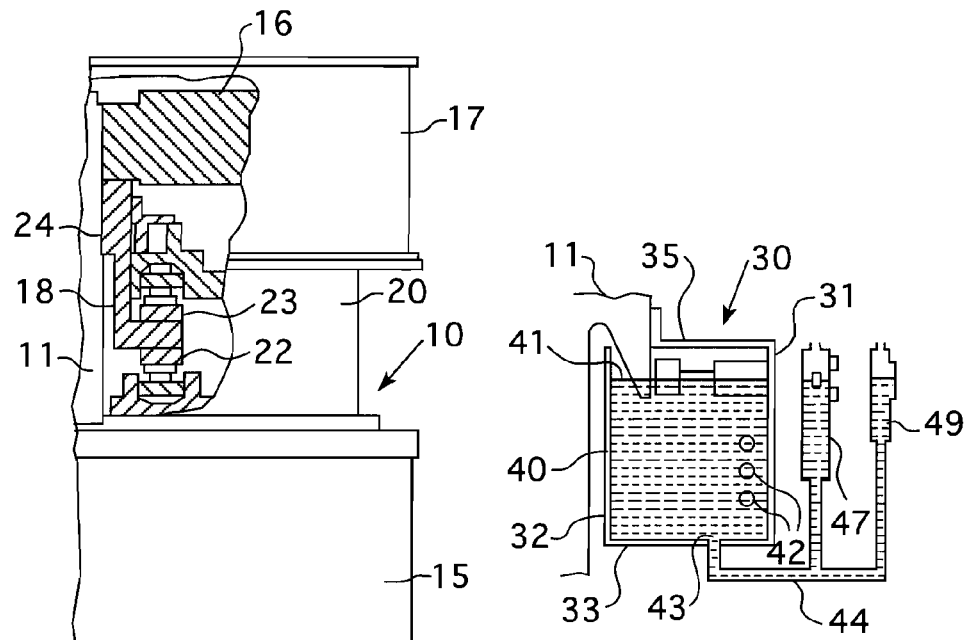
FIG.1 Prior Art
FIG.3 Prior Art

US 8,246,313 B2

DYNAMIC PORT FOR MEASURING REACTOR COOLANT PUMP BEARING OIL LEVEL

BACKGROUND OF THE INVENTION

1. Field of the Invention

The present invention relates to apparatus for measuring the level in an oil reservoir of a motor and more particularly to such apparatus for measuring the dynamic oil level in a reservoir surrounding a bearing on a motor shaft. More particularly, the invention relates to apparatus for monitoring the level of lubricating oil in the oil pot of a motor, the invention having particular application to reactor coolant pump motors in nuclear power plants.

2. Description of Related Art

The reactor coolant pump motors drive the reactor coolant pumps which are part of the primary reactor coolant system in a nuclear power plant. The motors are typically arranged with vertical shafts. The bearing and lubrication system of a vertical motor is usually contained in two separate oil pots (also referred to as oil reservoirs). An upper oil pot contains the upper guide or radial bearings and the total thrust bearing system. The lower oil pot contains the lower guide or radial bearings. Each of these oil pots is typically provided with cooling coils for carrying cooling water to dissipate the heat which is generated by the bearing systems.

The design of the oil pots is such that the oil level within the pot should be monitored during operation to ensure that the oil level is not rising above or falling below the expected levels. A rising level might indicate, for example, a water leak within the cooling coils which results in water entering the pot and mixing with the oil. If such a situation were to persist, the lubricating ability of the oil would be sharply diminished and, more importantly, the oil/water mixture would overflow the pot and migrate toward the hot reactor coolant pump, where a fire could result.

A falling oil level would be indicative of a leak in the oil pot system which allows oil to escape from the pots. If this situation persists, the level of oil in the pot would drop below the level where the oil lubricates the bearings and thus result in severe damage to the bearings and possibly to the motor shaft/runner. More importantly, this condition could also result in a fire if the oil, with a flash point of 420 degrees fahrenheit (215.56 degrees centigrade) reaches the pump surfaces which may be as hot as 550 degrees fahrenheit (287.87 degrees centigrade).

Because of these real and serious concerns, each of the two oil pots is equipped with an oil level detector which provides an alarm signal to a control room in the event of an unusual oil level condition. Some concern exists that the detector may generate a high level alarm when, in fact, the system is operating normally, i.e., there is no leakage of water into the oil pump. A major contributor to this potential problem, particularly with respect to the lower oil pot, is the expansion of the oil due to heat entering the oil pot from the reactor cooling pump. A temperature rise of 50 degrees fahrenheit (10 degrees centigrade) in the oil of the oil pot, for example, would result in a volume expansion of approximately 0.6 gallon (2.27 liters) in a 30 gallon (113.56 liters) capacity pot. This is reflected in the rise of the oil level within the pot and the detector of 0.5 inch (1.27 centimeters) or more, and could result in a spurious high level alarm signal.

Recently, a number of nuclear plant operators of pressurized water reactors have experienced a high oil level alarm on the lower bearing oil reservoir shortly after reaching normal operating temperature and pressure. The oil level during the start-up period had gradually increased during heat-up from an initial level of +0.8 inches (+2.0 centimeters) immediately following the across-the-line start. One plant operator noted that upon initial start-up of the pump motor, the oil level abruptly increased from the static zero level to this initial dynamic level. In the attempt to clear the ensuing alarm, two actions were performed. First, the lower oil level alarm switch assembly was adjusted approximately 3/16 of an inch (0.48 centimeters) upward, to the maximum limit of adjustment. This raised the alarm actuation for both the high oil level alarm point as well as the low oil level alarm point for the lower bearing oil reservoir. Prior to this adjustment, the lower oil reservoir alarms were set to occur at approximately +1.25 inches (+3.2 centimeters) above static for the upper alarm and approximately −1.25 inches (−3.2 centimeters) below static for the lower alarm. Second, the vent line between the oil level sight glass and the oil alarm reservoir was disconnected right above the sight glass venting both the alarm reservoir and the sight glass to the containment atmosphere. These directions were taken to clear the oil level alarm encountered during the heat-up of the plant by raising the overall alarm window and provide a more representative oil level based on a known oil inventory in the lower oil pot.

As the plant heat-up continued, the lower oil reservoir again experienced a high level alarm at 1.3 inches (3.3 centimeters) above the static oil level. The plant went on to operate at power and continued to experience a high oil level alarm; with the oil level oscillating between +1.3 and +1.5 inches (+3.3 and +3.8 centimeters) and tracking with changes in ambient and component cooling water temperatures.

The main purpose of the oil level indicating system on the main coolant pumps in pressurized water reactor systems manufactured by Westinghouse Electric Company LLC is for monitoring the oil inventory within the bearing oil reservoir. The original design concept behind the system used on the lower guide bearing oil reservoir on Westinghouse reactor coolant pump motors was a simple transference of indicated oil level from inside the bearing oil reservoir to an alarm switch reservoir and sight glass which is external to the lower bearing oil reservoir (sometimes referred to herein as the oil pot). This approach was taken to eliminate errors due to turbulent flows within the bearing oil reservoir that would be generated if the alarm float switch and sight glass were placed directly into the bearing oil reservoir.

The technical principle for the design of the oil level indicating system of Westinghouse reactor coolant pump motors is a simple force balance accomplished by transference of the pressures from the bearing reservoir to the alarm reservoir generated by the static elevation of a column of fluid. When the fluid is at rest, the height and therefore pressure differences of the oil columns in each reservoir are equal, assuming homogeneous temperatures and fluid properties throughout the system. The alarm reservoir oil level therefore matches the bearing reservoir oil level and oil inventory is easily monitored. Once the fluid is set in motion, however, it's been observed that the pressures in the bearing reservoir can change due to variations in temperature and velocity of the oil. This may unbalance the forces acting on the two oil columns causing unequal heights, or levels, of the columns. The oil may also become mixed with air, i.e., aeration; causing changes in oil properties that can tend to contribute to changes in the height of one or both oil columns. Thus, an oil level indicating system must consider these factors in addition to those of the operating environment when used for oil inventory monitoring.

SUMMARY OF THE INVENTION

It is in general logic of this invention to provide an improved oil reservoir arrangement for a vertical shaft pump motor which avoids the disadvantages of prior arrangements while affording additional operational advantages.

An important object of this invention is the provision of oil level monitoring apparatus for a pump motor oil reservoir which minimizes the dynamic affects of thermal expansion and hydraulic forces acting upon the oil.

In connection with the foregoing object, it is another object of this invention to provide an oil level monitoring apparatus which is simple to use and can be adjusted to accommodate for the unique characteristics of each plant.

It is another object of this invention to provide an oil level monitoring apparatus of the type set forth which minimizes the chance of spurious high level alarm signals.

In connection with the foregoing objects, it is another object of this invention to provide an oil level monitoring apparatus of the type set forth which is of simple and economical construction and contains no moving parts and consumes no power.

These and other objects of the invention are attained by providing apparatus for monitoring the level of bearing lubricating oil in the oil reservoir of a nuclear reactor coolant pump motor which has a predetermined normal oil level, the apparatus in part comprising: a vertical shaft; a bearing supporting the shaft; an oil reservoir for retaining a body of oil in fluid communication with the bearing; an indicator for indicating an oil level in the reservoir; and a fluid port extending into the reservoir and operatively connected with the indicator, the orientation of the fluid port within the reservoir being adjustable to compensate for the dynamic affects on the body of oil resulting from rotation of the rotatable shaft—the dynamic affects including such factors as thermal expansion of the oil and hydraulic forces.

In one preferred embodiment, the fluid port includes a hook shaped or an "L" shaped tube that extends vertically into the body of oil with a peripheral end bent horizontally and in fluid communication with the oil. Preferably, the vertical portion of the generally "L" or hook shaped tube is sealed to a bottom of the reservoir with a compression fitting. Desirably, the fluid port is adjustable by being rotatable about an axis of the compression fitting and vertical section of the tube.

Additionally, the foregoing objectives are achieved by a method of determining an oil level in such an oil reservoir including the steps of: determining the level of oil in the reservoir as indicated by the indicator when the motor is substantially in a static condition; bringing the motor up to an operating speed; and adjusting the fluid port within the reservoir until the indicator indicates substantially the same oil level at operating speed as it did in the substantially static condition. Preferably, the adjusting step is carried out shortly after the motor reaches operating speed and temperature and is accomplished by rotating the fluid port about an axis of a vertical section of the tube.

BRIEF DESCRIPTION OF THE DRAWINGS

A further understanding of the invention can begin from the following description of the preferred embodiments when read in conjunction with the accompanying drawings in which:

FIG. 1 is the fragmentary elevational view, in partial section, of a reactor coolant pump motor incorporating the oil level indicating system of the prior art;

FIG. 3 is a diagrammatic view of a lower oil reservoir of a prior art reactor coolant pump motor, with the oil therein at a normal level;

DESCRIPTION OF THE PREFERRED EMBODIMENTS

Figure 2:
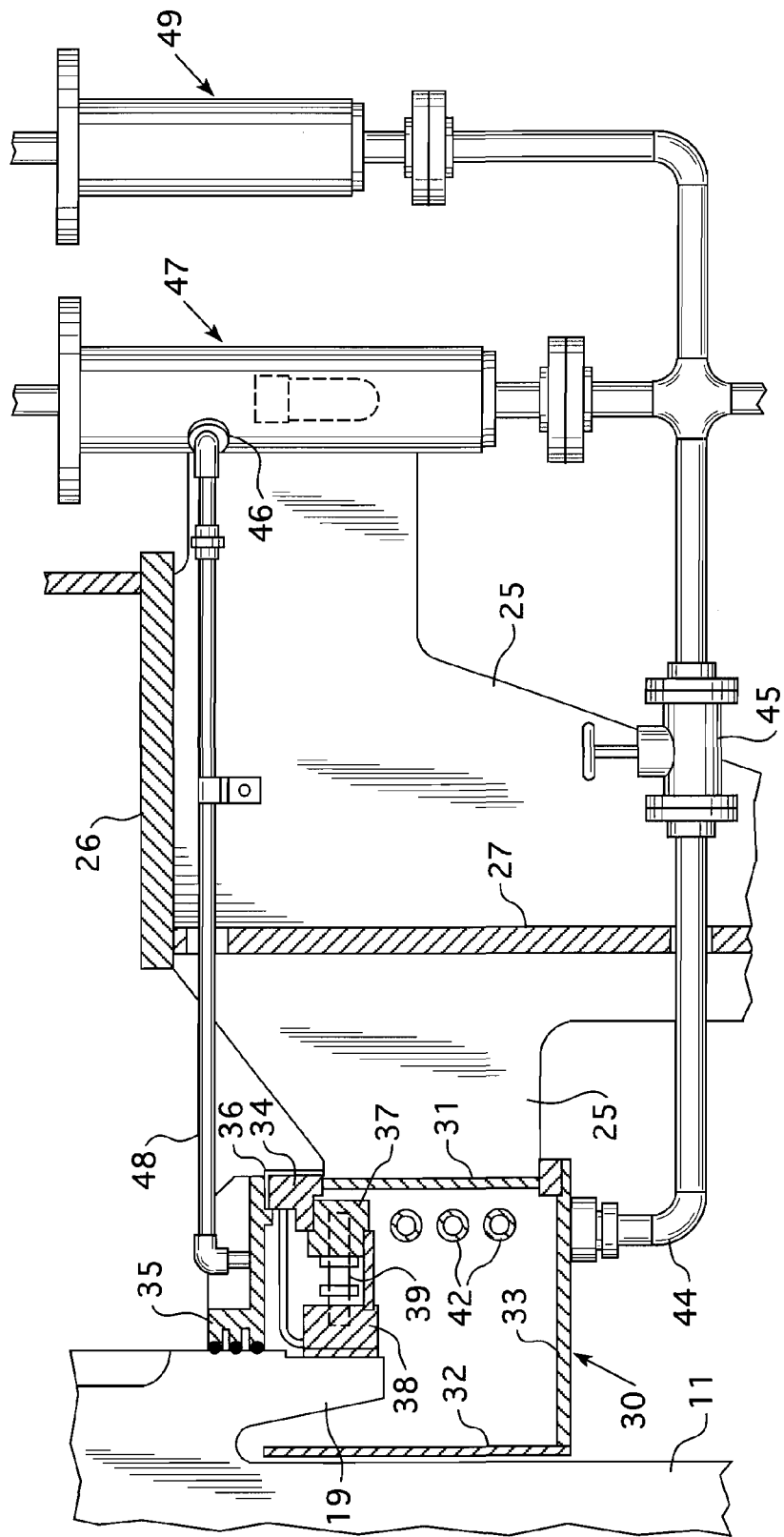
FIG. 2 is the enlarged fragmentary view in vertical section of the lower portion of the pump motor of FIG. 1 showing an enlarged view of the oil level indicating system of the prior art.

Referring to FIG. 1 of the drawings, there is illustrated a reactor coolant pump motor, generally designated by the numeral 10, which is of conventional construction. The motor 10 includes a vertical shaft 11 on which is mounted a rotor core assembly (not shown) surrounded by a stator core assembly 13 which is supported between lower and upper brackets 14 and 15. The upper end of the shaft 11 carries a flywheel 16 mounted within a flywheel cover 17. The shaft 11 is provided with upper and lower annular runners 18 and 19.

The upper runner 18 extends into an annular upper oil pot 20 encircling the shaft 11 and is disposed for engagement with an up-thrust bearing 22, and down-thrust bearing 23 and an upper guide bearing 24, all disposed within the upper oil pot 20. The lower runner 19 extends downwardly into an annular lower oil pot 30 which encircles the shaft 11 and is supported on a plurality of equiangularly spaced-apart lower support webs 25, the webs 25 being interconnected by an annular support plate 26 and by cylindrical connecting webs 27.

Referring to FIGS. 1 and 3 of the drawings, the lower oil pot 30 includes a cylindrical outer wall 31 and a cylindrical inner wall 32, the walls 31 and 32 being interconnected by an annular bottom wall 33. Fixedly secured to the outer wall 31 at the upper edge thereof is a circular head rail 34 which supports thereon an annular seal 35, a gasket 36 being provided therebetween. The seal 35 is disposed in sealing engagement with the runner 19 of the shaft 11. Carried by the head rail 34 within the oil pot 30 is a support ring 37 (FIG. 2). A plurality of bearing shoes 38 are disposed for bearing engagement with the outer surface of the runner 19 at equiangularly spaced-apart points thereround, the bearing shoes 38 being respectively held in engagement with the runner 19 by a plurality of adjusting screws 39 carried by the support ring 37.

All of the structure described above is of a conventional construction and is provided in prior art reactor coolant pump motors. The lower oil pot for such a prior art motor is disclosed in a front elevational view partially in section in FIG. 2 and diagrammatically in FIG. 3. The oil pot 30 contains a volume of oil 40 which, at ambient temperatures, normally fills the oil pot 30 to a level 41 illustrated in FIG. 3. A plurality of cooling coils 42 carry cooling water through the oil pot 30 for cooling the oil 40 therein. The oil pot 30 communicates at a port 43 in the bottom wall 33 with a conduit 44 which connects through a valve 45 to one or more oil level gauges, which may include a float gauge 47 and the sight gauge 49. Both of the gauges 47 and 49 are in liquid communication with the conduit 44 so that the oil rises therein to the same level 41 as is present in the oil pot 30. The float gauge 47 carries a floating element which is disposed for magnetically operating high and low sensor switches to indicate abnormally high and low levels of the oil 40 in the oil pot 30. The sight gauge 49 typically includes a transparent window portion so that the level of oil 40 therein can be visibly observed.

The high level indication is to indicate excess fluid in the oil pot 30 which might be occasioned by a water leak within the cooling coils 42, resulting in water entering the oil pot 30 and mixing with the oil 40. Such a high level would typically trigger an alarm signal, since the dilution of the oil 40 would lessen its lubricating ability and, more importantly, as the leak continued the oil/water mixture might overflow the oil pot 30 and contact the hot reactor coolant pump causing a fire. The low level sensor is for the purpose of indicating a falling oil level in the oil pot 30, which might be indicative of an oil leak. Such a low level would trigger an alarm signal since a continued leak would cause the oil level to drop to the point where the oil no longer lubricates the bearing shoes 38, resulting in severe damage to the bearing shoes and, possibly to the motor shaft 11 and/or runner 19. Furthermore, this condition could also result in a fire if the leaking oil were to contact the hot pump surfaces.

In this prior art arrangement, the oil 40 in the oil pot 30 tends to expand when heated. Indeed, despite the cooling effect of the cooling coils 42, the oil 40 may be heated to such an extent that it expands to a level such that it will actuate the high level sensor in the float gauge 47 setting off a high level alarm. Such an alarm is spurious since it is not occasioned by excess fluid in the oil pot 30.

If one accepts that the lower guide bearing reservoir 30, when filled to the normal static level has the proper inventory of oil in which to operate, and any change to the observed level within the alarm assembly following motor start-up is due to factors acting on this proper inventory, then we can also accept that the dynamic oil level will reach an equilibrium that also represents the proper inventory of oil.

The factors that influence the observed dynamic, or running, oil level are primarily hydraulic and thermal. These factors have a direct and predictable outcome in the change of observed oil levels between static and dynamic conditions. As the motor accelerates to speed, the velocity of oil within the lower bearing oil reservoir 30 increases, as does turbulence within the reservoir. In addition, temperature changes from the production of heat due to the rubbing velocity of the bearing 38 and the journal (shaft) 11, as well as increases in containment temperature may affect the overall volume but not the inventory of oil. Temperature changes cause changes in density and viscosity of the oil, resulting in thermal volumetric expansion and changes in oil flow velocities. Additionally, some amount of oil aeration is expected to occur due to the turbulence and splashing of the oil, causing further volumetric expansion of the oil in the system. When thermal and hydraulic conditions stabilize, the dynamic oil level stabilizes and becomes a new baseline reference oil level that is the proper dynamic indication of oil inventory.

Depending on the lower bearing assembly and oil level indicating system designs, the baseline reference level may, in fact, match the static level, but this ideal performance is not always achieved, as the dynamic level often deviates from the static level. This deviation usually is unimportant. What is important is that the level obtained with the motor energized at normal operating temperature and pressure remains stable within a tolerance band once thermal and hydraulic equilibrium is achieved. Fluctuations due to normal variations in ambient and cooling water temperature are expected and acceptable. The baseline reference level can also vary between different motors depending on the particular designs of the lower guide bearing, the oil reservoir, and the level indicating system, and also due to variations in operating conditions, particularly thermal variations. This too is acceptable and expected. Variations in oil level and other motor parameters also have been observed to occur when one motor is moved to another motor compartment in the same power plant. The difficulty with the current oil level system is that the oil level alarm switch assembly on this motor does not have sufficient adjustment range to place the high alarm above the baseline reference level to prevent alarm actuation. Thus, the baseline reference level exceeds the high alarm level causing an alarm condition with the plant at power, which is not acceptable.

Figure 4:
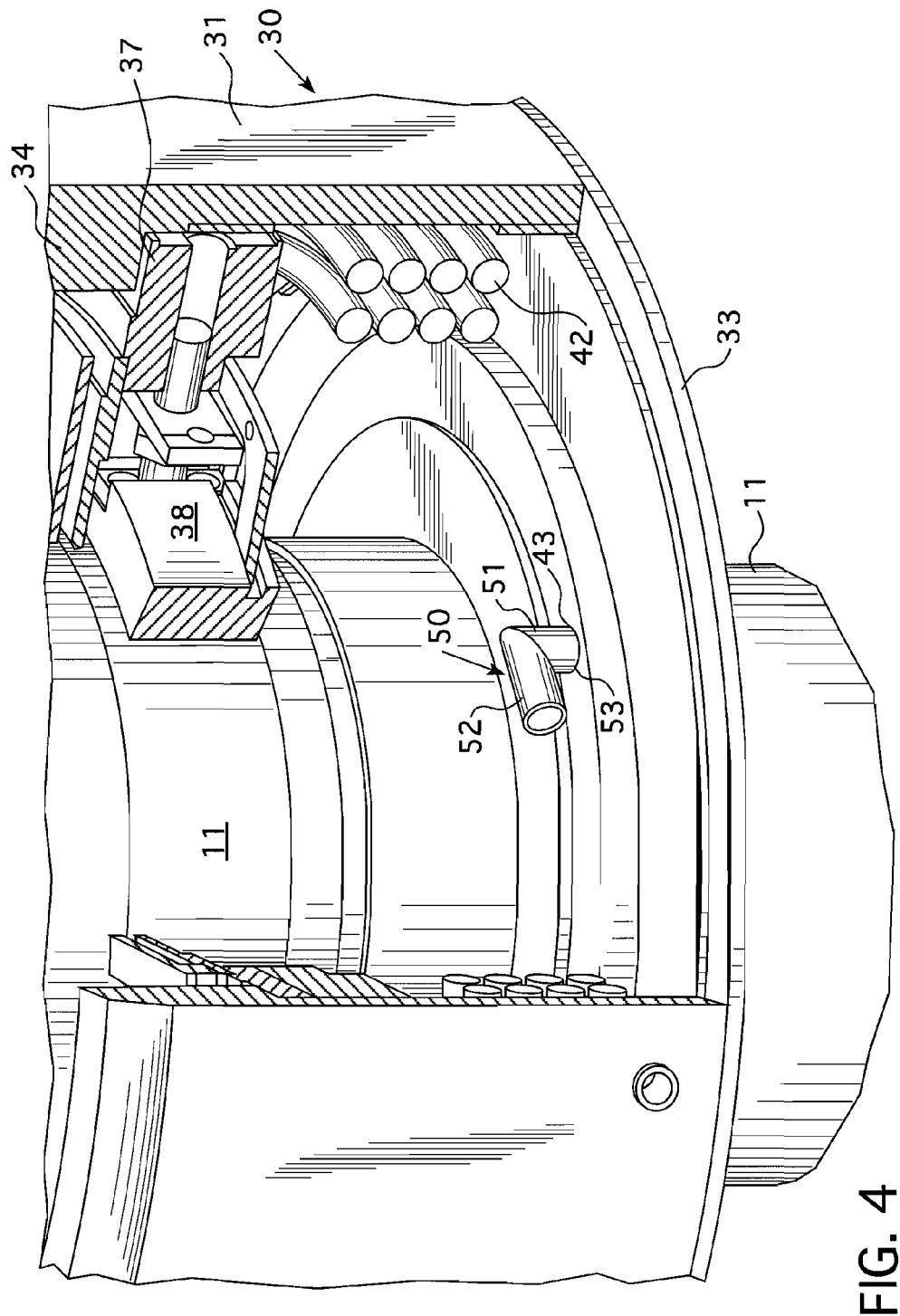
FIG. 4 is a perspective view of the lower guide bearing oil reservoir of this invention with a portion thereof cut away to show the "L" shaped fluid inlet port to the oil level indicating system of this invention.

As illustrated in FIG. 4, this invention provides a new dynamic port 50 in the bottom wall 33 of the oil reservoir 30 that seats in the existing port 43 that is in fluid communication with the gauge conduit 44. The purpose of the dynamic port 50 is to allow for the ability to adjust, or tune, the observed running oil level at the lower oil reservoir in reactor cooling pump motors, back to the static level, which will prevent unwarranted level alarms and misunderstandings about actual oil inventory. The dynamic port 50 provides a means to adjust the oil pressure transmitted to the alarm reservoir and sight glass measurement, allowing utility operators to have a consistent and reliable oil level reading during operation. As lubrication and heat removal is such a crucial element of bearing life, the inaccuracy of the current monitoring system is unacceptable and this modification will cure that problem for utility operators.

One preferred embodiment of the dynamic port 50 illustrated in FIG. 4 comprises a generally "L" shaped tube having an approximately straight vertically extending section 51 which extends from the port 43 upwards and bends horizontally to form the peripheral section 52 that has an opening at its distal end that is in fluid communication with the gauge conduit 44 through the port 43 in the bottom wall 33 of the oil reservoir 30. A compression fitting 53 functions as the primary seal in the bottom wall 33 of the oil reservoir 30 and also forms the means of adjustment to turn the port 50 so that the horizontal section 52 can rotate about its vertical section 51 to adjust the dynamic oil level in the level indicating gauges 47 and 49. When the motor is running during power plant start-up, the dynamic port 50 may be positioned as needed into or out of the flow path of the oil in order to transmit a pressure to the float guide alarm reservoir 47 and sight gauge 49 that will bring the running oil level back to the static oil level. Thus, the method of this invention determines the level of oil in the reservoir as indicated by the oil level indicators 47 and 49 when the motor is in a substantially static condition, i.e., not running. When the motor is brought up to normal operating speed and temperature, the dynamic port 50 is adjusted by rotating the port until the oil level indicator indicates the same oil level at operating speed as it did in the substantially static condition. Though the dynamic port 50 is shown as having an abrupt right angle between the vertical section 51 and the horizontal peripheral section 52 it should be appreciated that the transition between the two sections 51 and 52 can be gradual, in the increments or rounded.

Figure 5:
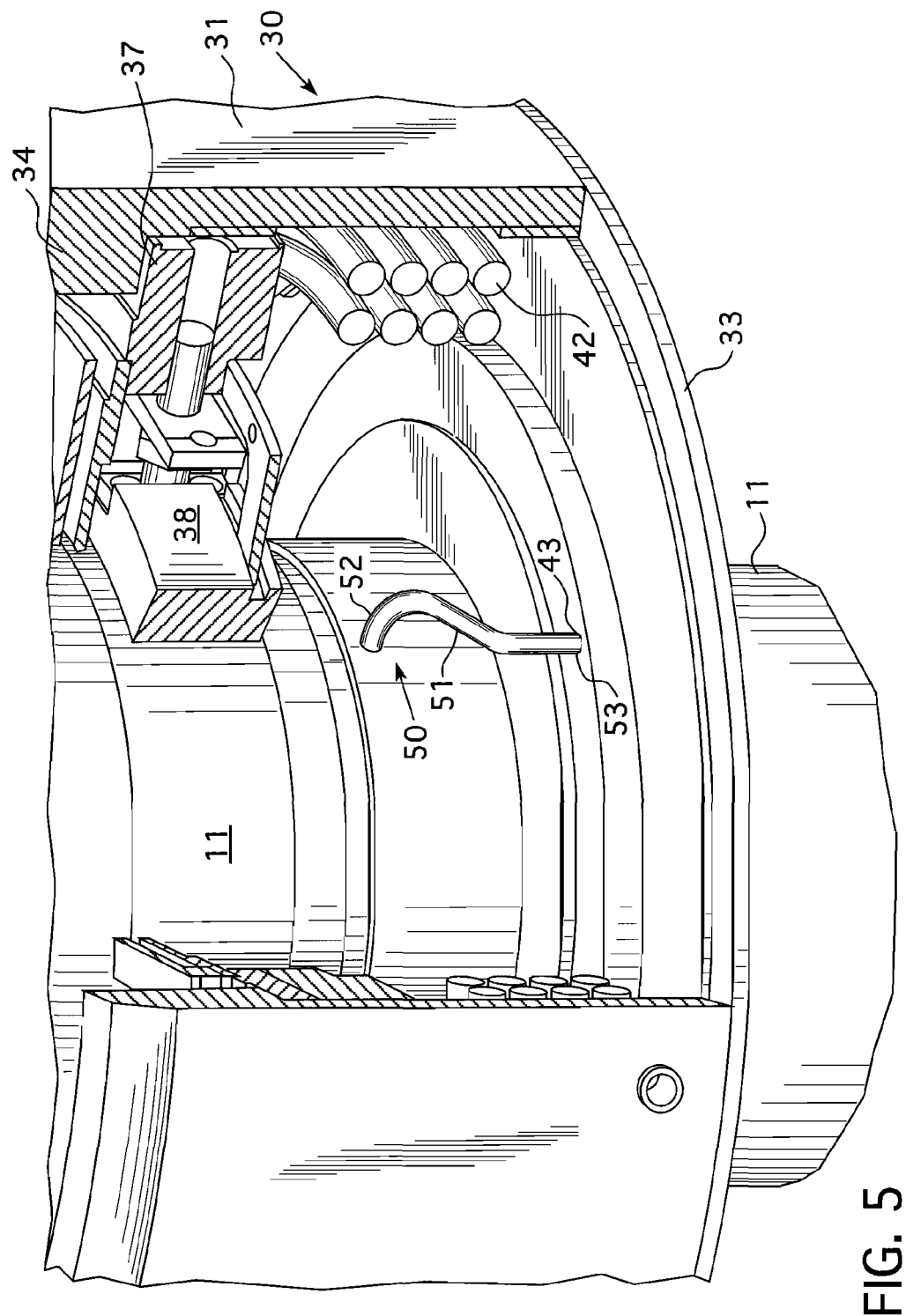
FIG. 5 is a perspective view of the lower guide bearing oil reservoir of this invention with a portion thereof cut away to show the hook shaped fluid inlet port to the oil level indicating system of this invention.

FIG. 5 illustrates another preferred embodiment of the dynamic port 50. Like reference characters are used for the components of FIG. 5 that correspond to the components of FIG. 4. The only difference in FIG. 5 over that shown in FIG. 4 is that the dynamic port 50 has a hook shape which increases its sensitivity. In addition, the hook shape enables the dynamic port to be inserted through the existing opening 43 in the floor 33 of the oil pot 30. In all other respects the embodiment shown in FIG. 5 operates the same as was described for the embodiment illustrated in FIG. 4.

Therefore, while a generally hooked shaped and "L" shaped dynamic port 50 have been illustrated, it should be appreciated that the shape of the dynamic port can be any shape with a vertical component that protrudes through the floor of the oil pot via a seal, where the tip can be manipulated to adjust the pressure. For example, the dynamic port 50 may have a flexible tip that can be reshaped to accomplish the objective of lowering the dynamic oil level reading.

Accordingly, while specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention, which is to be given the full breadth of the appended claims and any and all equivalents thereof.

What is claimed is:

1. A method of determining an oil level in an oil reservoir surrounding a bearing that supports a rotating shaft in a motor, the reservoir retaining a body of oil in fluid communication with the bearing for lubricating the bearing and having an indicator for indicating the oil level, the reservoir including a fluid port, a portion of the fluid port extending into and above a bottom of the reservoir, the fluid port operatively connected with the indicator, the orientation of the portion of the fluid port extending into and above a bottom of the reservoir being adjustable to compensate for the dynamic affects on the body of oil resulting from rotation of the rotatable shaft, including the steps of:

determining the level of oil in the reservoir as indicated by the indicator when the motor is in a substantially static condition;

bringing the motor up to an operating speed; and adjusting the portion of the fluid port extending into and above the bottom of the reservoir until the indicator indicates substantially the same oil level at operating speed as it did in the substantially static condition.

2. The method of claim 1 wherein the adjusting step is carried out after the motor reaches operating speed.

3. The method of claim 1 wherein the portion of the fluid port extending into and above the bottom of the reservoir includes an adjustable tube that extends vertically into the body of oil with a peripheral end in fluid communication with the oil wherein the adjusting step includes the step of rotating the fluid port about a vertical axis of a section of the tube that extends vertically.

4. The method of claim 3 including the step of sealing the vertical portion of the tube to a bottom of the reservoir with a compression fitting.

5. The method of claim 1 wherein the portion of the fluid port extending into and above the bottom of the reservoir includes an adjustable tube that extends vertically into the body of oil with a peripheral end bent substantially horizontal and in fluid communication with the oil wherein the adjusting step includes the step of rotating the fluid port about a vertical axis of a section of the tube that extends vertically.

6. The method of claim 1 wherein the adjusting step is carried out after the motor reaches operating speed and temperature.

* * * * *